Patented Nov. 20, 1951

UNITED STATES PATENT OFFICE 2,575,840

2,575,840

CYCLOPENTANOPHENANTHRENE DERIVATIVES AND PROCESS

George Rosenkranz and Stephen Kaufmann, Mexico City, Mexico, assignors to Syntex, S. A., Mexico City, Mexico, a corporation of Mexico No Drawing. Application March 24, 1948, Serial No. 16,884. In Mexico September 20, 1947

7 Claims. (Cl. 260—239.55)

The present invention relates to novel cyclopentanophenanthrene derivatives and a process for producing the same. More particularly the present invention relates to novel derivatives of cyclopentanophenanthrene substituted by a side chain at the 17 position and by a keto group at the 16 position.

In its more specific aspects, the present invention is directed to the production of novel compounds, namely 16 dihydrokryptogenin and the esters thereof, to a process for producing the same, and to the production of steroidal sapogenin derivatives from 16 dihydrokryptogenin and/or its esters, these derivatives being especially suitable as intermediates in the manufacture of hormones.

The steroidal sapogenin kryptogenin was first described by Marker, Wagner, Goldsmith, Ulshafer, and Ruof (Journal of American Chemical Society, 65—739 (1943)), and the following formula was suggested:

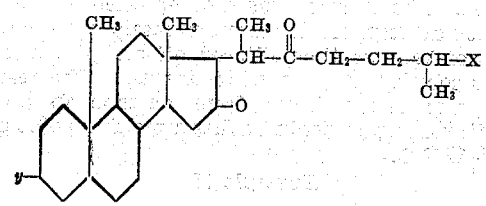

Kryptogenin

It was also suggested in the same article that kryptogenin could be converted in etherial solution into 5,6-dihydrokryptogenin by catalytic hydrogenation in the presence of small amounts of acetic acids and Adams catalyst.

The surprising discovery has been made in accordance with the present invention, however, that by utilizing a finely divided nickel catalyst, as for example, Raney nickel, and in a slightly alkaline or neutral medium, derivatives of cyclopentanophenanthrene having a keto group at the 16 position and a side chain at the 17 position, can be hydrogenated at the 16 position whether or not there is present an unsaturated group elsewhere in the phenathrene nucleus. As, for example, compounds according to the following general formula:

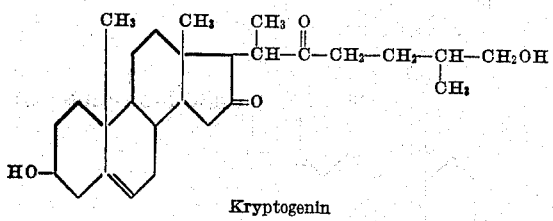

wherein X is a CH₂OH group or a group convertible to a CH₂OH group as, for example COOR, COOH, CHO or CHOR, Y is an OH group or an OR group and R is any saturated aliphatic or aromatic radical incapable of easy reduction, can be converted to compounds represented by the following two tautomeric formulas:

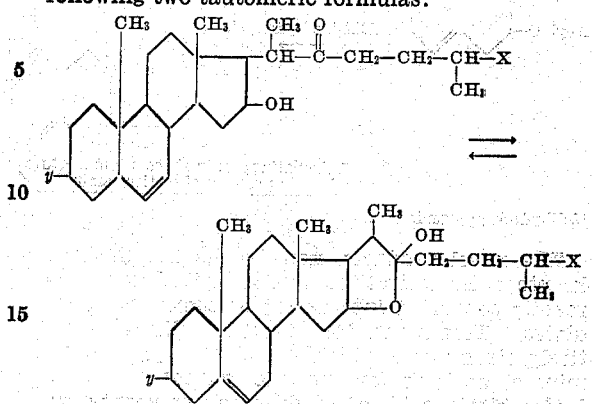

Stated differently, it has been discovered that a nickel catalyst, for example, under substantially neutral conditions is selective in its action and hydrogenation takes place at the 16 position. The above reaction is especially applicable to hydrogenation in the 16 position of kryptogenin and its esters in accordance with the following equation:

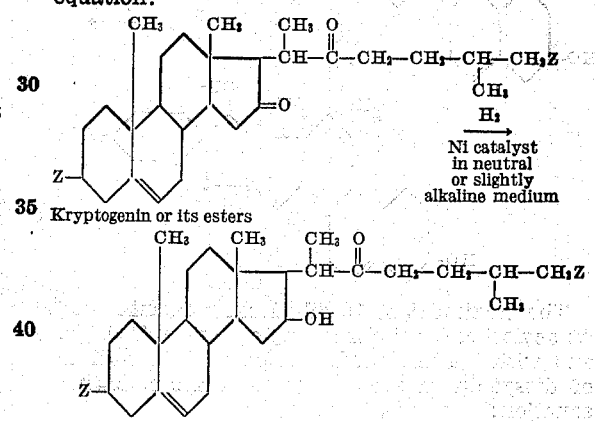

16 dihydrokryptogenin or ester

In the above formula, Z may be OH or O-acyl. The acyl group may be substantially any aliphatic saturated radical or an aromatic saturated radical. For example, if the acyl group is an aliphatic saturated radical it may be the residue of any suitable fatty acid and preferably the lower fatty acids, such as acetic. In the alternative, the residue of an aromatic saturated acid may be utilized as, for example, benzoic.

The cyclopentaneophenanthrene nucleus may also contain substituents providing these substituent groups do not interfere with the hydrogenation. For example, 5,6 dihydrokryptogenin prepared in accordance with the processes of the prior art may be further hydrogenated in accordance with the present invention, to 5,6-16 tetrahydrokryptogenin. The esters of 16-dihydrokryptogenin may be converted to 16-dihydrokryptogenin by hydrolysis in an alkaline medium and 16-dihydrokryptogenin may be converted to the esters of 16-dihydrokryptogenin by treatment with acylating agents at room temperatures preferably in the presence of tertiary amines such as pyridine or dimethyl aniline. These reactions are illustrated by the following equations:

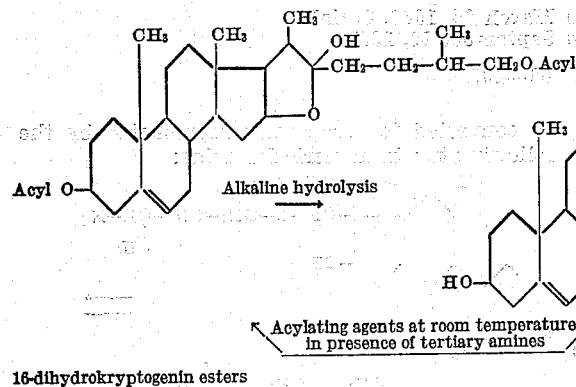

16-dihydrokryptogenin esters

The novel products, namely the 16-dihydrokryptogenin derivatives just described, may be readily converted into useful hormone intermediates. Treatment, for example, with a relatively strong acid which may be an organic or mineral acid, as for example, glacial acetic or hydrochloric acid, of 16-dihydrokryptogenin or its esters produces diosgenin in accordance with the following reaction:

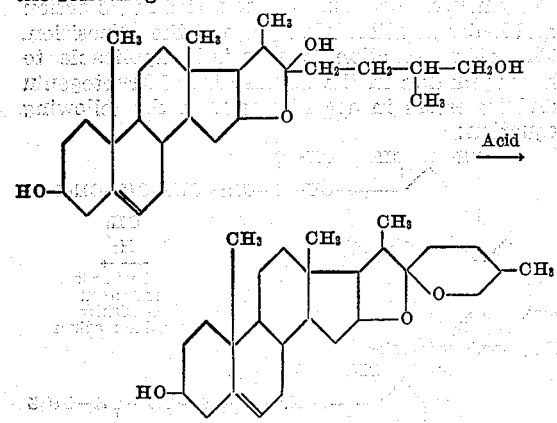

The treatment of 16-dihydrokryptogenin with an acylating agent, for example acetic anhydride, and with heating produces the acyl derivatives of diosgenin in accordance with the following equation:

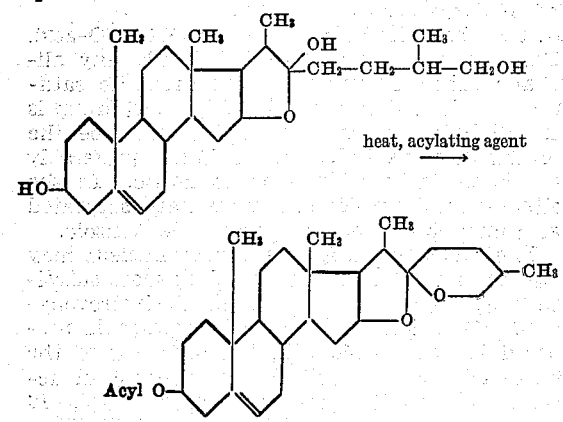

The treatment of the esters of 16-dihydrokryptogenins with dehydrating agents as, for example, tetrahydronaphthalene, phosphorus oxychloride, thionyl chloride, etc. the last two preferably in the presence of tertiary amines as, for example pyridine or dimethyl aniline, produces 16-dihydrokryptogenin esters of pseudo-diosgenin in accordance with the following equation:

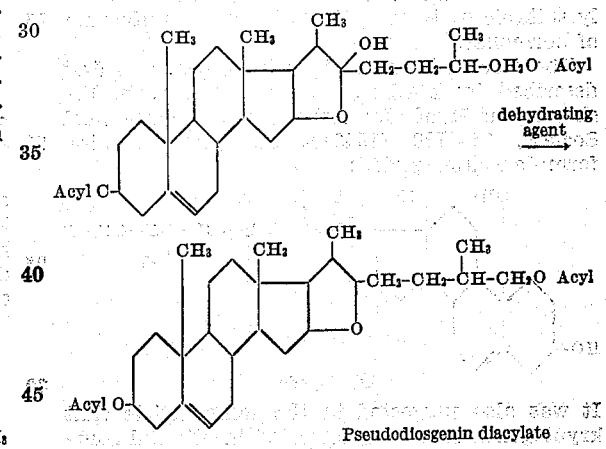

Pseudodiosgenin diacylate

In every case the foregoing reactions are generally applicable to the 5,6 dihydrokryptogenin and its 16-dihydrokryptogenin derivatives, namely the 5,6-16 tetrahydrokryptogenin or derivatives thereof. For example when 5,6-16 tetrahydrokryptogenin is treated with a relatively strong acid, tigogenin is produced. The following specific examples serve to illustrate the present invention but are not intended to limit the same.

*Example I*

60 grams of kryptogenin were dissolved in 600 cc. of alcohol and 30 grams of Raney nickel were added. The mixture was then agitated in a hydrogen atmosphere for approximately two hours. The nickel was then filtered off and the alcoholic solution evaporated to dryness. The residue was recrystallized from acetone to give 16-dihydrokryptogenin having a melting point of 173°–175° C.

*Example II*

10 grams of the 16-dihydrokryptogenin of Example I were dissolved in 50 cc. of cold glacial acetic acid. After standing for five minutes pure diosgenin, having a melting point of 202°–203° C., crystallized therefrom.

Example III 10 grams of the 16-dihydrokryptogenin of Example I were dissolved in 30 cc. of acetic anhydride and refluxed for a half-hour. The solution was then cooled and after cooling a product crystallized which was identified as diosgenin acetate. The product was recrystallized from ethyl acetate and was found to have a melting point of 196°–198° C.

Example IV 60 grams of kryptogenin diacetate were dissolved in 1200 cc. of alcohol and 30 grams of Raney nickel were added. The mixture was agitated in a hydrogen atmosphere for two hours. The nickel was filtered off and the alcoholic solution evaporated to dryness. The residue was a colorless viscous oil which did not crystallize. Further reactions with the residue indicated that it was the diacetate of 16-dihydrokryptogenin.

Example V 30 grams of the 16-dihydrokryptogenin diacetate of Example IV were dissolved in 300 cc. of alcohol containing 30 grams of potassium hydroxide. The reaction mixture was refluxed for half an hour. At the end of this time the mixture was poured into water and extracted with ether. The ether solution was washed free from alkali with water and the neutral solution was dried and evaporated to dryness. The residue was crystallized from acetone to give 16-dihydrokryptogenin. Melting point 173°–175° C.

Example VI 54 grams of the 16-dihydrokryptogenin diacetate of Example IV were dissolved in 200 cc. of benzol and 30 cc. of pyridine and 10 cc. of phosphorus oxychloride were added. The mixture was refluxed for two hours on a water bath. At the end of this period water was added and the mixture extracted with ether. The ether solution was washed until neutral, dried and evaporated to dryness. The residue was crystallized from ether-methanol and a product which was identified as pure pseudodiosgenin diacetate having a melting point of 97°–98° C. was produced.

Example VII 10 grams of the 16-dihydrokryptogenin diacetate of Example IV were dissolved in 100 cc. of alcohol containing 10% of hydrochloric acid. The mixture was refluxed for five hours. At the end of this time the mixture was poured into water and the crystalline precipitate filtered off. Upon recrystallization from alcohol, pure diosgenin was obtained having a melting point of 202°–203° C.

Example VIII 10 grams of the 16-dihydrokryptogenin of Example I were dissolved in 200 cc. of pyridine and 20 cc. of acetic anhydride at room temperature. After standing 24 hours, the reaction mixture was poured into water and extracted with ether. The ether solution was washed with water until neutral, dried and evaporated to dryness. The residue was a viscous oil which did not crystallize and proved to be the diacetate of 16-dihydrokryptogenin, similar to Example IV.

It will be obvious to those skilled in the art that various changes may be made without departing from the spirit of the invention and therefore the invention is not limited to what is described in the specification but only as indicated in the appended claims.

What is claimed is:

1. As a new product the 16-dihydro cyclopentanophenanthrenes selected from the group consisting of compounds having a general formula selected from the group consisting of:

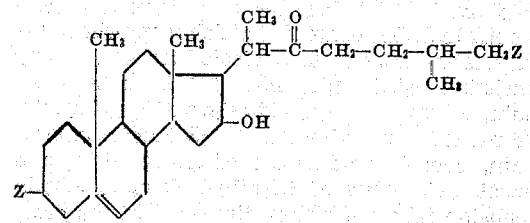

and the tautomer,

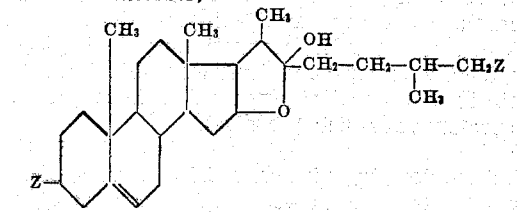

wherein Z in each instance is selected from the group consisting of OH and O-acyl and acyl is selected from the group consisting of a fatty acid radical and a benzoic acid radical and the corresponding 5,6-dihydro compounds.

2. As a new product 16-dihydrokryptogenin having a melting point between 173–175° C. and the general formula selected from the group consisting of:

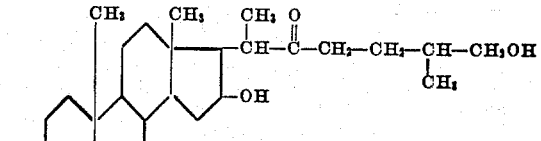

and the tautomer,

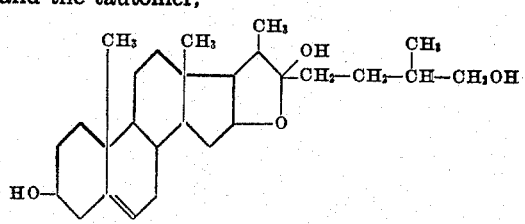

3. As a new product the diacetate of 16-dihydrokryptogenin having a general formula selected from the group consisting of:

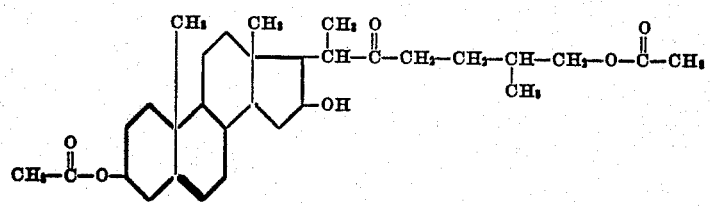

and the tautomer,

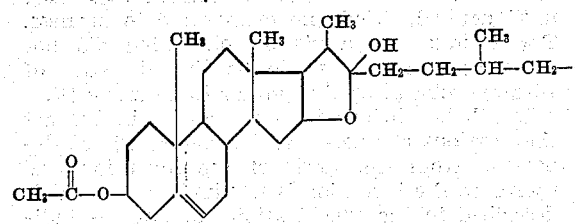

4. A process for the production of compounds selected from the group consisting of 16-dihydrokryptogenin, 5,6-16-tetrahydrokryptogenin, saturated fatty acid esters of 16-dihydrokryptogenin, saturated fatty acid esters of 5,6-16-tetrahydrokryptogenin, benzoic acid esters of 16-dihydrokryptogenin and benzoic acid esters of 5,6-16-tetrahydrokryptogenin which comprises hydrogenating a compound selected from the group consisting of kryptogenin, 5,6-dihydrokryptogenin, saturated fatty acid esters of kryptogenin, saturated fatty acid esters of 5,6-dihydrokryptogenin, benzoic acid esters of kryptogenin and benzoic acid esters of 5,6-dihydrokryptogenin in a substantially neutral medium and in the presence of a finely divided nickel catalyst to produce the corresponding 16-dihydro derivatives.

5. A process for the production of 16-dihydrokryptogenin comprising hydrogenating kryptogenin in a substantially neutral medium and in the presence of a nickel catalyst.

6. A process for the production of 5,6-16-tetrahydrokryptogenin comprising hydrogenating 5,6-dihydrokryptogenin in a substantially neutral medium and in the presence of a nickel catalyst.

7. A process for the production of 16-dihydrokryptogenin diacetate which comprises hydrogenating in a substantially neutral medium kryptogenin diacetate in the presence of a nickel catalyst to produce 16-dihydrokryptogenin diacetate.

GEORGE ROSENKRANZ.
STEPHEN KAUFMANN.

REFERENCES CITED

The following references are of record in the file of this patent:

UNITED STATES PATENTS

| Number | Name | Date |
| --- | --- | --- |
| 2,352,850 | Marker | July 4, 1944 |
| 2,408,832 | Wagner | Oct. 8, 1946 |

OTHER REFERENCES

Marker et al., J. Am. Chem. Soc., vol. 65, p. 739 (1943).

Marker et al., J. Am. Chem. Soc., vol. 65, pp. 1199–1209 (1943).